(12) United States Patent
Friesen et al.

(10) Patent No.: US 8,445,133 B2
(45) Date of Patent: May 21, 2013

(54) ELECTRODE FOR A CHARGE STORAGE DEVICE AND METHOD OF MANUFACTURE

(75) Inventors: Cody A. Friesen, Fort McDowell, AZ (US); Allison Michelle Engstrom, Phoenix, AZ (US); Erika Lyn Engstrom, Phoenix, AZ (US); Joel Hayes, Chandler, AZ (US)

(73) Assignee: Arizon Board of Regents for and on Behalf of Arizona State University, Tempe, AZ (US)

( * ) Notice: Subject to any disclaimer, the term of this patent is extended or adjusted under 35 U.S.C. 154(b) by 519 days.

(21) Appl. No.: 12/748,775

(22) Filed: Mar. 29, 2010

(65) Prior Publication Data

US 2010/0243459 A1   Sep. 30, 2010

Related U.S. Application Data

(60) Provisional application No. 61/164,609, filed on Mar. 30, 2009.

(51) Int. Cl.
*H01M 4/04* (2006.01)

(52) U.S. Cl.
USPC .......................................... 429/209

(58) Field of Classification Search
USPC .......................................... 429/209
See application file for complete search history.

(56) References Cited

U.S. PATENT DOCUMENTS

| | | | |
|---|---|---|---|
| 5,772,934 A * | 6/1998 | MacFadden | 264/42 |
| 6,096,453 A | 8/2000 | Grunwald | |
| 7,144,658 B2 | 12/2006 | Long et al. | |
| 7,332,108 B2 * | 2/2008 | Chartier et al. | 252/519.1 |
| 7,985,505 B2 * | 7/2011 | Yang et al. | 429/405 |
| 2004/0131934 A1 | 7/2004 | Sugnaux et al. | |

\* cited by examiner

*Primary Examiner* — Stuart Hendrickson
(74) *Attorney, Agent, or Firm* — Pillsbury Winthrop Shaw Pittman, LLP

(57) ABSTRACT

An electrode for a charge storage device and a method for forming the electrode. The electrode comprises an electrode body having an essentially continuous phase of an active material, an essentially continuous phase of an electroconductive material, and an essentially continuous phase of void space. The active material is oxidized by applying a potential to the electrode body in the charge storage device so as to transform the active material to an oxide species thereof. The resulting oxide species of the active material has a higher active surface area than the active material prior to the oxidizing.

60 Claims, 8 Drawing Sheets

ELECTRODE FOR A CHARGE STORAGE DEVICE AND METHOD OF MANUFACTURE

This application claims the benefit of priority from U.S. Provisional Application No. 61/164,609 filed Mar. 30, 2009, the entire content of which is incorporated herein by reference.

BACKGROUND OF THE INVENTION

1. Field of the Invention

The present invention pertains to electrodes, and more particularly to an electrode for a charge storage device and a method of manufacturing the electrode.

2. Discussion of Related Art

Demand for rechargeable charge storage devices has increased with increased demand for portable electronic equipment such as portable computers, power tools, consumer electronics, etc. Presently, there are various types of charge storage devices. One type of charge storage device is a conventional battery which can provide a high energy density (Wh/Kg) and thus can supply energy for a relatively long period of time, but has a limited power density (W/Kg). Another type of charge storage device is a conventional capacitor which can deliver a relatively high power density (W/Kg) but has a limited energy density (Wh/Kg). Batteries, which are based on the movement of charge carriers in a liquid electrolyte, have relatively slow charge and discharge times. Capacitors, on the other hand, can be charged or discharged at a rate that is typically limited by resistive heating of the electrodes.

On the other hand, the advent of electrical double layer supercapacitors provides energy densities that are perhaps $1/10$th that of a conventional battery with a power density that is generally ten to one-hundred times greater than the power density of a conventional battery. However, thin-film based supercapacitors have limited applications.

BRIEF SUMMARY OF THE INVENTION

One aspect of the present invention provides method for forming an electrode of a charge storage device. The method comprises: forming a mixture of particulates comprising an active material, an electroconductive material, and a void defining material into an electrode body comprising an essentially continuous phase of the active material, an essentially continuous phase of the electroconductive material, and an essentially continuous phase of the void defining material; removing the void defining material from the electrode body so as to leave behind an essentially continuous phase of voids; disposing the electrode body in an electrochemical cell; and oxidizing the active material by applying a potential to the electrode body in the cell so as to oxidize the active material, wherein the resulting oxidized active material has a higher active surface area than the active material prior to said oxidizing. Another aspect of the invention provides an electrode for a charge storage device made by this method.

Another aspect of the invention provides an electrode for a charge storage device. The electrode comprises an electrode body having an essentially continuous phase of an active material, an essentially continuous phase of an electroconductive material, and an essentially continuous phase of void space. The active material is oxidized by applying a potential to the electrode body in the charge storage device so as to oxidize the active material. The resulting oxidized active material has a higher active surface area than the active material prior to said oxidizing.

Another aspect of the invention provides a charge storage device. The charge storage devices comprises an electrode having an electrode body including an essentially continuous phase of an active material, an essentially continuous phase of an electroconductive material, and an essentially continuous phase of void space. The active material is oxidized by applying a potential to the electrode body in the charge storage device so as to oxidize the active material. The resulting oxidized active material has a higher active surface area than the active material prior to said oxidizing.

Another aspect of the invention provides a method for forming an electrode of a charge storage device. The method comprises forming a mixture of particulates comprising a metallic active material, an electroconductive material, and a void defining material into an electrode body comprising an essentially continuous phase of the metallic active material, an essentially continuous phase of the electroconductive material, and an essentially continuous phase of the void defining material; removing the void defining material from the electrode body so as to leave behind an essentially continuous phase of voids; disposing the electrode body in an electrochemical cell; and oxidizing the metallic active material by applying a potential to the electrode body in the cell so as to oxidize the metal thereof to a metal oxide. Another aspect of the invention provides an electrode for a charge storage device made by this method.

Another aspect of the invention provides an electrode for a charge storage device. The electrode comprises an electrode body including an essentially continuous phase of a metallic active material, an essentially continuous phase of an electroconductive material, and an essentially continuous phase of void space. The metallic active material is oxidized by applying a potential to the electrode body in the cell so as to oxidize the metal thereof to a metal oxide.

Another aspect of the invention provides a charge storage device. The charge storage device comprises an electrode having an electrode body including an essentially continuous phase of a metallic active material, an essentially continuous phase of an electroconductive material, and an essentially continuous phase of void space. The metallic active material is oxidized by applying a potential to the electrode body in the cell so as to oxidize the metal thereof to a metal oxide.

These and other objects, features, and characteristics of the present invention, as well as the methods of manufacture, operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF EMBODIMENTS. OF THE INVENTION

Figure 1:
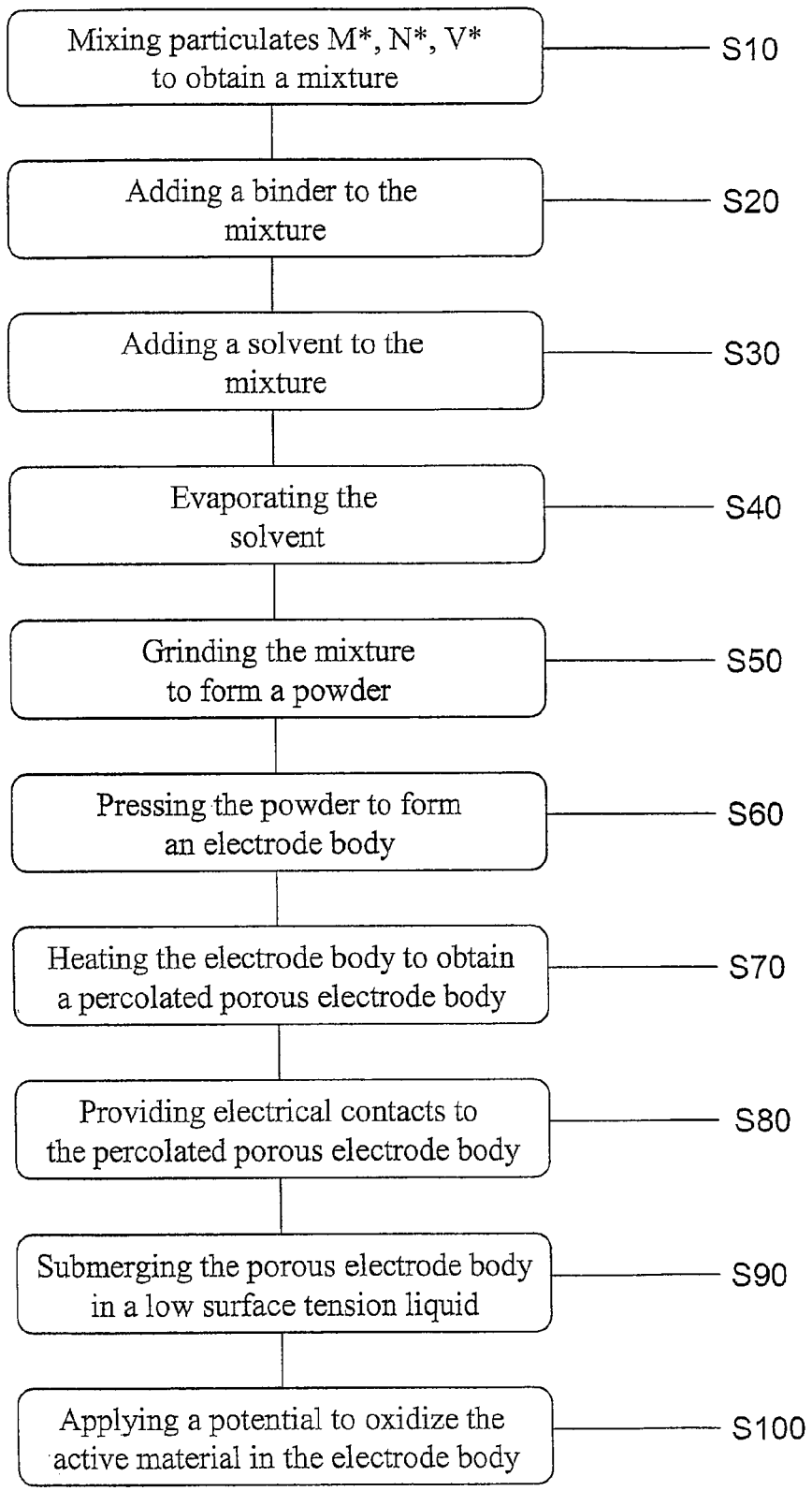
FIG. 1 is a flow chart depicting a method for manufacturing an electrode for a charge storage device, according to an embodiment of the present invention.

FIG. 1 is a flow chart depicting a method for manufacturing an electrode for a charge storage device, according to an embodiment of the present invention. The method includes measuring and mixing particulates comprising an active material N*, an electroconductive material M*, and a void defining material V*, at S10. The electroconductive material M* can include a metal (e.g., nickel, platinum, etc.), a metal alloy (e.g., nickel-chromium, INCONEL®, HASTELLOY®, or brass), a conductive metal oxide, a conductive polymer (e.g., carbon filled TEFLON®), or carbon powders, or a mixture of two or more thereof. The active material N* is a material that can be oxidized or reduced over an operating range of potentials for the charge storage device. The active material N* can include a metal, such as manganese, ruthenium, nickel, vanadium, cobalt, iron, titanium, or any combination of two or more of these metals, or a metal oxide such as $MnO_2$ or $CO_2O_3$. When the term metallic or metal is used, that is referring to an essentially unoxidized metal, and not a metal oxide species of the metal (except for routine, (e.g., pure or in an alloy) minor surface oxidation that can occur from general atmospheric conditions). The void defining material V* can be a polymeric material such as polystyrene (PS), an oxide such as silica ($SiO_2$) or a salt such as NaCl. In one embodiment, the void defining material V* can have generally the shape of spheres. However, as it can be appreciated, other shapes can also be used, for example, cubes, cylinders, pyramids, dodecahedrons, icosahedrons, or other more complex shapes, or any combination of two or more of these shapes.

The method further includes adding a binder at S20, adding a solvent to the mixture, at S30 and evaporating the solvent at S40. For example, the binder can be added to the particulate mixture at to facilitate compaction. The binder can be selected from a polymer material such as polyethylene glycol (PEG) pr polyvinyl pyrrolidine (PVP). For example, in one embodiment, an alcohol solvent can be added to the particulate mixture, at S30. The mixture can be subjected to ultrasound energy to promote conglomerate segregation of the M* particles. The mixture can then be placed in a drying oven to facilitate solvent evaporation, at S40. For example, the mixture can be placed in an oven atmosphere at a temperature below 100° C.

Following evaporation of the solvent, at S40, the mixture of M*, N* and V* particulates is ground to form an essentially homogenous powder, at S50.

The powder is then pressed into a die (e.g., a cylinder shaped die) using an arbor press, at S60 to form an electrode body comprising an essentially continuous phase of the active material N*, an essentially continuous phase of the electroconductive material M*, and an essentially continuous phase of the void defining material V*. For example, the powder can be subjected to a force between about 100 pounds and about 500 pounds. Using a quarter inch diameter die, this results in a pressure between about 2 and about 10 ksi. The addition of the binder material to the particulate mixture at S20 can help keep the shape before the formed electrode body can be further processed.

After forming the electrode body into an appropriate shape (e.g., a disk shape, a parallelepiped shape, etc.), at S60, the method proceeds to removing the void defining material V* from the electrode body so as to leave behind an essentially continuous phase of voids, at S60.

In one embodiment, the void defining material V* (e.g., polystyrene) can be removed by pyrolysis to obtain a porous electrode body. The removing of the void defining material comprises heating the electrode body to cause pyrolysis of the void defining material V*. In one embodiment, the heating comprises heating in a reducing atmosphere. In another embodiment the void defining material V* can be removed by using an etchant. For example, when the void defining material V* includes silica ($SiO_2$), an etchant may be used to etch the silica to create the voids, or in the case of a salt (e.g., NaCl) the void material can be dissolved with water or some other solvent.

In one embodiment, the electrode body can be heated in a tube furnace in a reducing atmosphere, at S70. In one embodiment, the electrode body is heated at a ramp rate between about 25° C./hr and about 300° C./hr, for example at a ramp rate of about 50° C./hr. The electrode body is heated to a temperature between about 350° C. and about 950° C., for example, between about 450° C. and about 550° C. The electrode body is held at this temperature for a time period between about 0.5 hour to about 4 hours, for example, between about 1 hour to about 2 hours. After performing the heating treatment process at S70, the electrode body is brought to room temperature.

During the heat treatment process, the electroconductive material particles (e.g., metal particles) M* begin to coarsen and sinter together facilitating the percolated intimate contact for electrical conduction. The nanometer sized space in the interstices between the electroconductive material M* particles and the active material particles N* creates a first level of porosity (nanometer scale porosity) that aids in an increased surface area. The heating treatment procedure is performed in a reducing atmosphere so as to reduce or prevent oxidation of the electroconductive material M*.

In addition, during the heat treatment procedure, the void creating material V* undergoes pyrolysis in the reducing atmosphere. The heat treatment procedure removes the percolated V* resulting in a relatively large (e.g., micron-sized) percolated void spaces (e.g., spherical spaces). The percolated void spaces V* create a second level of porosity (micron scale porosity) for electrolyte transport and ionic conduction.

In one embodiment, electrical contacts are provided to the porous electrode body so as to establish external electrical contact to the electrode body, at S80. For example, in one embodiment, the electrode body is disposed between two electroconductive screens such as metal screens using a metal wire. In another embodiment, the electrode body is disposed between a pair of electroconductive plates such as two metal plates.

In one embodiment, the porous electrode body is submerged in a low surface tension liquid, at S90 so as to promote wetting of the surface of the electrode body. In one embodiment, the low surface tension liquid is a solvent such as an alcohol. In one embodiment, after wetting the surface of the porous electrode body, the low surface tension liquid is then exchanged for nanopure water with several rinsing steps and water baths.

The wetted porous electrode body can then be transferred to an electrochemical charge storage device to operate as an electrode. The porous electrode body is immersed in an electrolyte solution in the charge storage device. In one embodiment, the electrolyte is an alkaline aqueous solution such as lithium hydroxide or potassium hydroxide. In one embodiment, the pH of the electrolyte is about 14. In alternate embodiments, non-aqueous electrolytes with available protons in their structures can be used. Examples of non-aqueous electrolytes that can be used include protic ionic liquids such as ethylammonium nitrate. In one embodiment, a counter and reference electrodes are used along with the porous electrode body in the electrochemical charge storage device. In one embodiment, the counter and reference electrodes are a platinum or iridium wire and Hg/HgO (+98 mV versus SHE), respectively.

Oxidation of manganese metal generally occurs within pH values in the range of 7.5 to 15. The oxidation state of the oxide is dependant on the potential applied to the electrode. For example, $MnO_2$ may be produced by applying potentials in the range of 1.05 V to 0.15 V vs. SHE. Other oxides possible are $Mn_2O_3$, produced in the range of 0.55 V to 0.25 V, and $Mn_3O_4$, produced in the range of 0.25 V to −0.45 V. Manganese also forms a hydroxide phase at even lower potentials in the range of 0 V to −1.6 V. In initially oxidizing the active material in the electrode of the present invention, the metallic manganese may, for example, be initially oxidized to the $MnO_2$ region. During operation of the electrode, the $MnO_2$ may be cycled through the other oxide phases to charge the electrode via the pseudocapacitance process, then back to the $MnO_2$ region to discharge the electrode. The extent to which these oxides form depends on the time the electrode is held at the charging potential. This may be done, for example, in an electrolyte of lithium hydroxide with a pH of about 14. Other electrolytes, such as potassium hydroxide (KOH) or sodium hydroxide (NaOH) may also be used, but lithium hydroxide is preferred.

Once the electrochemical charge storage device is established, the active material in the porous electrode body is oxidized, at S100, by applying a potential to the porous electrode body in the electrochemical charge storage device so as to oxidize the active material in situ. That is, the metal is oxidized from its unoxidized metallic form to an oxide species thereof (or if the active matter is initially a metal oxide, it is further oxidized). In one embodiment, the transformation is irreversible. It is also possible to apply the potential for initial oxidation of the electrode in a separate manufacturing cell prior to assembling the electrode with the oxidized active material into the charge storage device.

Once this process is complete, a tri-continuous electrode body is formed where three distinct percolated phases compose the electrode body. The sintered electroconductive particles provide the electrical conduction, the percolated void spaces allow electrolyte transport and ionic conduction, and the electrochemically oxidized active material provides a pseudocapacitive active surface area.

Figure 2A:
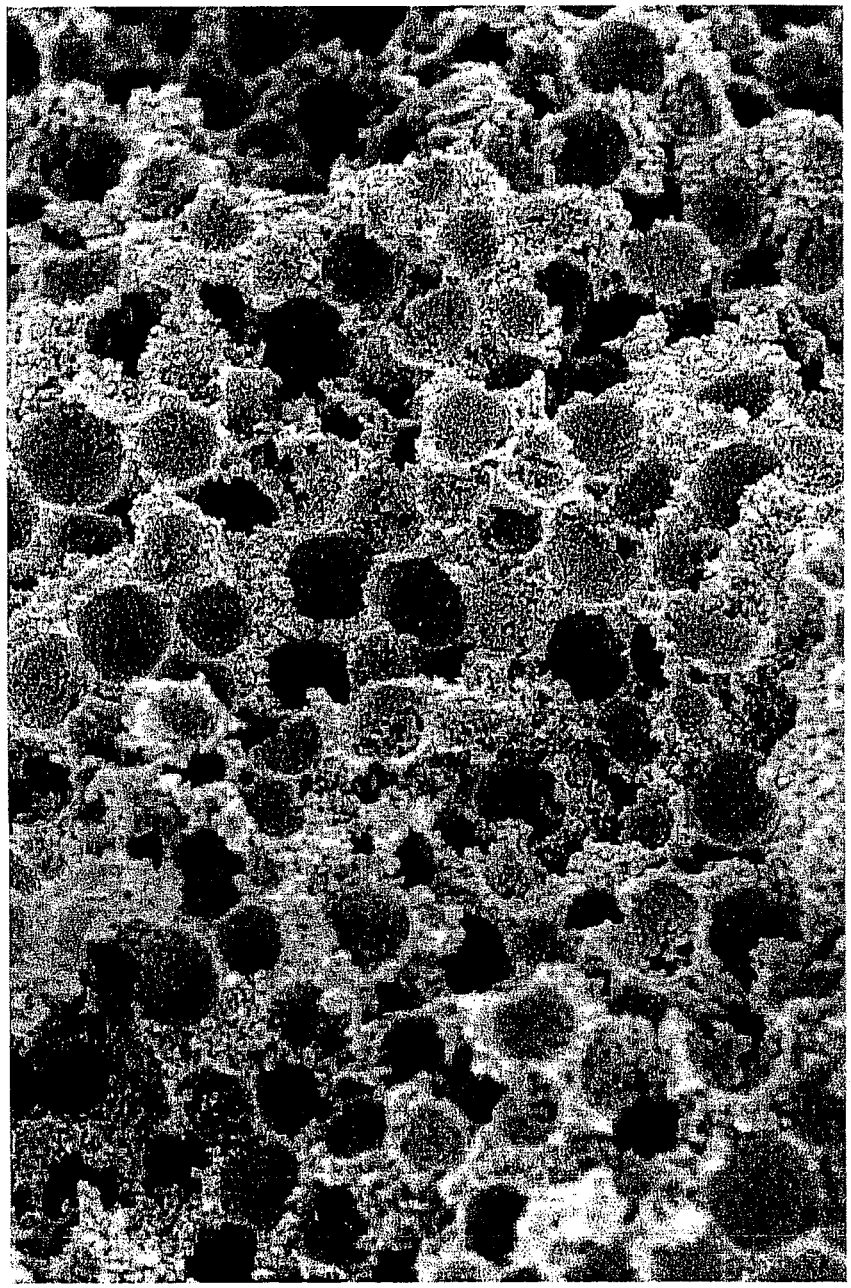
FIG. 2A is a scanning electron microscope image of the electrode body with the oxidized active material, according to an embodiment of the present invention.
Figure 2B:
FIG. 2B is a zoomed image of an area of the scanning electron microscope image shown in FIG. 2A.

FIG. 2A is a scanning electron microscope image of the electrode body with the oxidized active material, according to an embodiment of the present invention. As shown in FIG. 2, the electrode material has a sponge-like structure with a percolated "spherical" cavities created by removal of the void forming material V* and with walls of the cavities being formed by the combination of percolated electroconductive material M* and the percolated oxidized active material N*. FIG. 2B is an enlarged image of an area of the scanning electron microscope image shown in FIG. 2A. FIG. 2B shows ridges formed on the electroconductive material M* which correspond to the oxide species of the active material N*. The ridges on the material M* resemble a sea urchin shell surface. The oxide species of the active material N* has a higher active surface area than the active material N* prior to the oxidizing. Indeed, the ridges formed by the oxide species of the active material N* provide an increased surface that come in contact with the electrolyte and hence provide an enhanced reactive surface to ultimately provide an improved pseudocapacitive behavior. In addition, by oxidizing the active material N* a volume occupied by the active material N* can be increased.

To operate as an electrolytic ultracapacitor on the principles of pseudocapacitance, the charge storage device has three phases in intimate contact (i.e., a tri-phase network). The three phases are the active phase (the oxide of the active material N*), an electrically conducting phase (the electroconductive material M*), and the ion conducting phase (the electrolyte within the voids V*).

In one embodiment, the performance of the porous electrode body within the charge storage device can be enhanced by optimizing the electrical conductivity between the active phase (N*) and the conducting phase (M*) and optimizing the ionic conductivity between the ion conducting phase (in the void phase V*) and the active phase (N*). This can be achieved by minimizing the size of the active material and providing an increased intimate contact between the active material and the electroconductive material.

Hence, one aspect of an embodiment of the present tri-phase network is to select appropriate length scale of the three percolated phases so as to achieve increased electrical contact while providing a good ionic conductivity. To achieve larger surface areas while providing increased electrical contact, nanometer-size powders can be utilized for both the electrically conductive material and the active material. To achieve better electrolyte transport and thus higher ionic conductivity throughout the bulk of the material, micron-size void creating particles may be used. By nanometer-size, it is meant sizes on the order of 1-999 nanometers and by micron-size, it is meant sizes on the order of 1-500 microns.

Another aspect of an embodiment of the present tri-phase network is that the active material N* is oxidized after incorporation of the active material N* into the electrically conductive material M*. In this way, a more intimate contact between the oxide species of the active material N* and the electrically conductive material M* can be achieved. Specifically, due to oxygen uptake by the active material N*, the active material N* expands to intimately contact the conductive material M*. Preferably, the active material is oxidized from an elemental metal or alloy to an oxide species thereof, but in some embodiments the oxidation may be from one oxide species to another. Preferably, the oxidation is from a metal of metal alloy to an oxide species, which typically provides for more initial density a greater expansion and change is surface area.

In the following paragraphs experimental data for exemplary embodiments of a tri-phase network are presented. The experimental data are obtained for a system where M*, N* and V* materials are manganese, nickel and polystyrene spheres, respectively. However, as it can be appreciated, other tri-phase network systems can be used.

Electrode samples are fabricated using the method described above at varying volume ratios of manganese to nickel. Specifically, the volume ratio of the manganese and nickel to the volume of the total composition is varied from about 5% to about 50% volume percent.

For example, using chronoamperometry in the same charge storage device used during the electrochemical oxidation process, the samples are held potentiostatically for a charge of 5000 seconds at a desired potential between about −100 mV and about −800 mV versus the open circuit potential (OCP) and a discharge of 5000 seconds at the previous OCP. A current response during the discharge cycle is used for calculating the specific capacitance.

Figure 3:
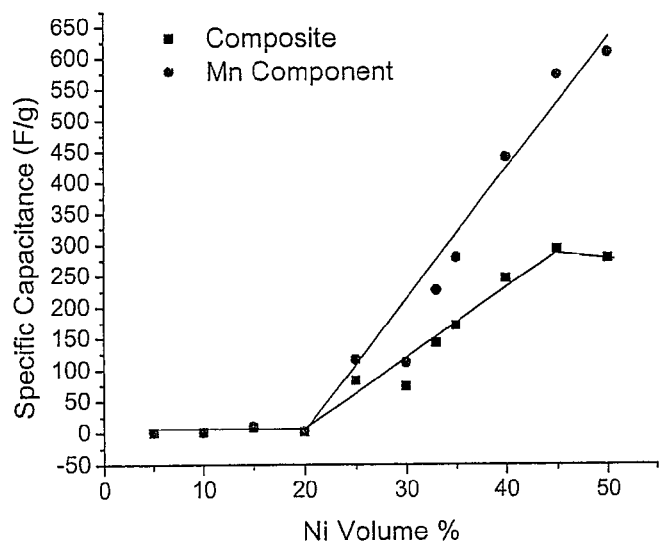
FIG. 3 are plots showing the specific capacitance as a function of volume ratio of nickel relative to the total composition, according to an embodiment of the present invention.

FIG. 3 includes plots showing the specific capacitance as a function of volume ratio of nickel relative to the total composition, according to an embodiment of the present invention. The square points in one plot correspond to measurement points of a specific capacitance of the bulk material (i.e., the manganese component plus the nickel component) versus percentage of nickel volume. The circle points in the other plot correspond to measurement points of specific capacitance relative to manganese content versus percentage of nickel volume. As shown in FIG. 3, the low specific capacitance measurements of the bulk obtained between 5% and 20% volume nickel indicates that the nickel content is below a percolation threshold thus producing poor electrical conduction throughout the bulk material. Between 20% and 45% volume nickel, the specific capacitance increases linearly with nickel content, indicating that the increase in nickel volume ratio increases the amount of active material manganese in contact with the electroconducting material nickel. In this example, beyond 45% volume nickel, a decrease in bulk capacitance seems to indicate a transition to a system limited by the decreasing active material (manganese) content. The calculated capacitance with respect to the active material manganese does not show a maximum at the 45 percent mark due to the simultaneous decrease in active material (manganese) content. Therefore, this result shows that the optimal performance for the composite sample in this example is obtained for a percentage volume ratio of nickel to manganese 45/55, i.e. 45% nickel and 55% manganese.

Figure 4:
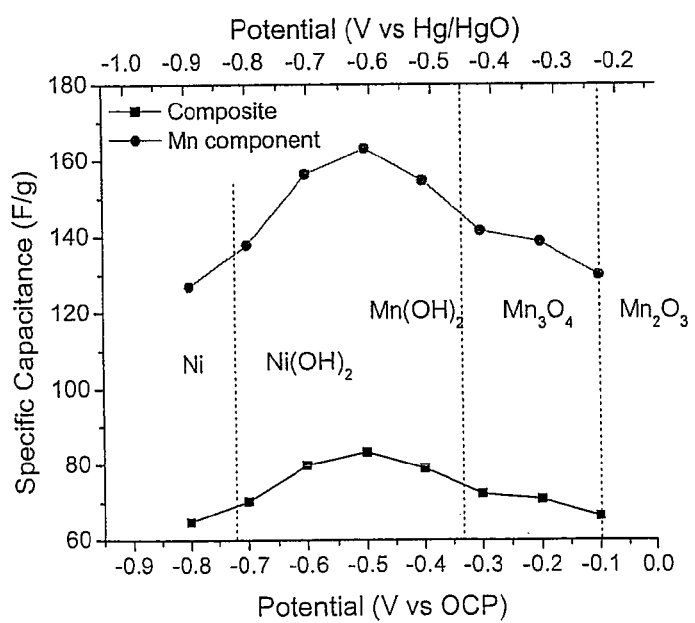
FIG. 4 depicts the specific capacitance results for various chronoamperometric potential holds from OCP, according to an embodiment of the present invention.

FIG. 4 depicts the specific capacitance results for various chronoamperometric potential holds from OCP, according to an embodiment of the present invention. These results are obtained by utilizing the 45% nickel and 55% manganese sample. FIG. 4 depicts the specific capacitance results (in F/g) for various chronoamperometric potential holds from OCP. The graph with circles points represents the specific capacitance relative to manganese content at various potentials. The graph with square points represents the specific capacitance relative to the bulk at various potentials. The bottom abscissa axis represents the potential versus OCP. The top abscissa axis represents the potential versus the Hg/HgO electrode. This experiment is performed for 5000 seconds. For these specifications, a maximum for the specific capacitance is found at about −500 mV versus the OCP which correlates below the $Mn_3O_4$ spinel phase in the active and electrically conductive material hydroxide phases.

Figure 5:
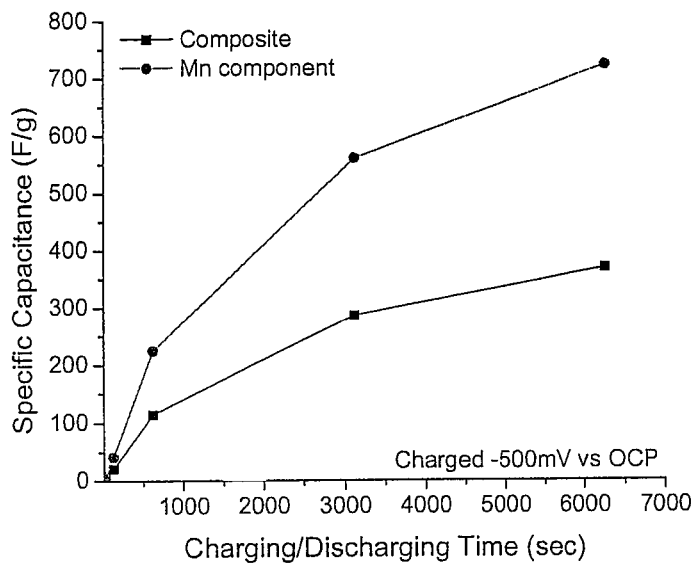
FIG. 5 shows plots of the specific capacitance relative to the bulk composite and relative to the manganese and a bulk material as a function of charging and discharging time, according to an embodiment of the present invention.

Another chronoamperometry experiment investigates the time-dependent performance of the charge storage device (e.g., ultracapacitor). The charging and discharging durations are varied between 5 and 6250 seconds (about 2 hours). FIG. 5 shows plots of the specific capacitance relative to the bulk composite and relative to the manganese as a function of charging and discharging time, according to an embodiment of the present invention. The plot with circle points represents the specific capacitance relative to manganese content as a function of charging or discharging time. The graph with square points represents the specific capacitance relative to the bulk composite content as a function of charging and discharging time. FIG. 5 indicates that with infinite time, the specific capacitance (either relative to manganese or relative to the bulk) would approach some limiting value associated with complete saturation of the pseudocapacitive effect. In this experiment the longest duration yielded a capacitance above 700 F/g for the active component while inclusion of the mass of the electrically conductive material resulted in a bulk capacitance above 350 F/g.

Figure 6:
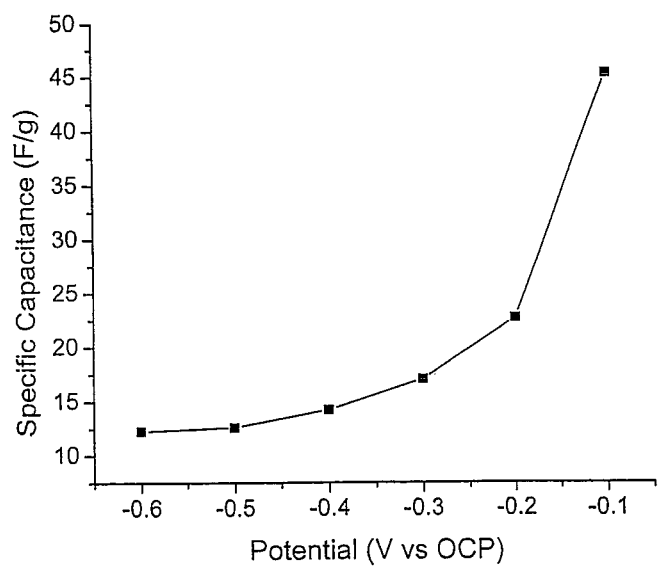
FIG. 6 is plot of specific capacitance the system N*/V* showed a specific capacitance an order of magnitude lower than the bulk composite M*/N*/V*, according to an embodiment of the present invention.

The contribution of the electrically conductive material to the bulk composite is also investigated. A sample system of N*/V* materials is synthesized for the nickel (M*) component following the method of manufacture of the electrode described above with respect to the M*/N*/V* system. FIG. 6 is plot of specific capacitance of the system N*/V* showing a specific capacitance an order of magnitude lower than the bulk composite M*/N*/V*. The maximum specific capacitance occurred at the lowest potential below the open circuit potential. This is indicative of primarily double layer capacitance because the double layer became saturated quickly, resulting in lower capacitances when the overall charge was divided by increasing holding potential. Therefore, it can be inferred that the contribution of the electroconductive material M* (e.g., nickel) to the bulk composite is minimal in comparison to the large pseudocapacitive contribution of the active material N* (e.g., manganese) or the oxide of the active material (e.g., manganese oxide).

Figure 7:
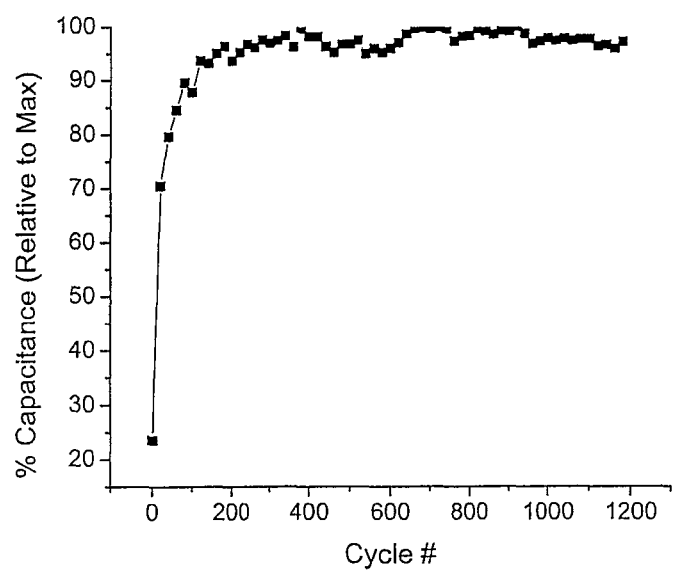
FIG. 7 is a plot of the percentage of capacitance relative to a maximum capacitance as a function of number of charge and discharge cycles, according to an embodiment of the present invention.

Long-term stability over several cycles can also be analyzed. Ultracapacitors have traditionally been considered highly stable due to the highly reversible redox reactions causing the pseudocapacitive effect. FIG. 7 is a plot of the percentage of capacitance relative to a maximum capacitance as a function of number of charge and discharge cycles, according to an embodiment of the present invention. An extended potentiostatic experiment is run to test this stability with short-time cycles where the charge and discharging durations are 10 seconds each. The stability of this tri-continuous composite is quite stable keeping within 95 percent of the maximum capacitance for over 1200 cycles with no appreciable decay.

Another feature of the electrode manufactured according to the above described method when used in an ultracapacitor is the performance of a two-electrode parallel ultracapacitor. In one embodiment, this can be accomplished by placing a porous electrically insulating medium between two ultracapacitor material electrodes where one electrode is connected as the working electrode and where the other is connected as the counter and reference electrode shorted together. From an operational standpoint, when one side of the parallel system is under oxidation, the other parallel ultracapacitor is under reduction and vice versa. For this parallel design, chronoamperometry and cyclic voltammetry were utilized to investigate the specific capacitance performance for parallel 45% nickel to 55% manganese samples.

Figure 8:
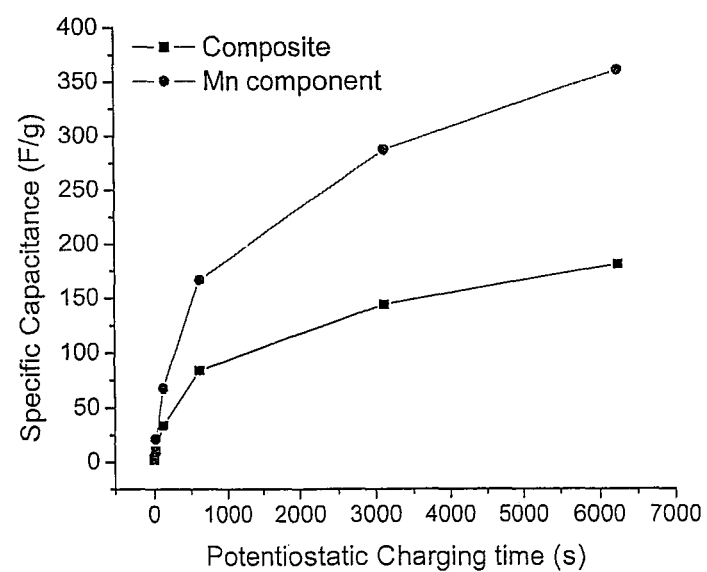
FIG. 8 depicts time-dependent results from an experiment where the charge and discharge cycles were −500 mV and +500 mV, respectively versus OCP, according to an embodiment of the present invention.

In chronoamperometry, the charging cycle is similar to the single supercapacitor procedure, however, during the discharging, the potential switches to the same value but opposite sign of the open circuit potential (OCP). FIG. 8 depicts time-dependent results from an experiment where the charge and discharge cycles were −500 mV and +500 mV, respectively versus OCP, according to an embodiment of the present invention. The results show that, the calculated specific capacitance for the active manganese component is above 350 F/g and the calculated specific capacitance for the entire bulk is above 150 F/g.

Figure 9:
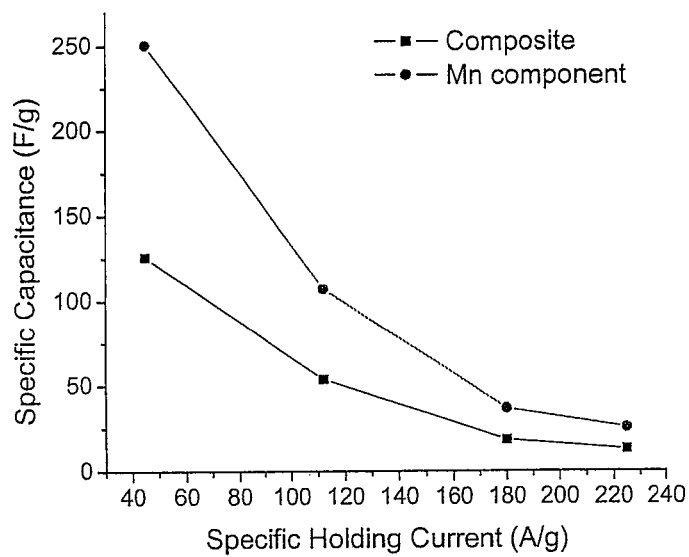
FIG. 9 shows two plots of specific capacitance as a function of specific holding current for the manganese component in the working electrode (circle dots) and for the entire bulk of the working electrode (square dots), according to an embodiment of the present invention.

In chronopotentiometry a current is applied to the working electrode and the potential response is measured. Once a specified potential is reached, the current polarity is switched causing the potential to drift in the opposite direction until a second potential boundary is reached. This constitutes one galvanostatic charge/discharge cycle. FIG. 9 shows two plots of specific capacitance as a function of specific holding current for the manganese component in the working electrode (circle dots) and for the entire bulk of the working electrode (square dots), according to an embodiment of the present invention. FIG. 9 shows the success of galvanostatic charge/discharge cycle illustrating the increase in specific capacitance with decreasing specific holding current.

Figure 10:
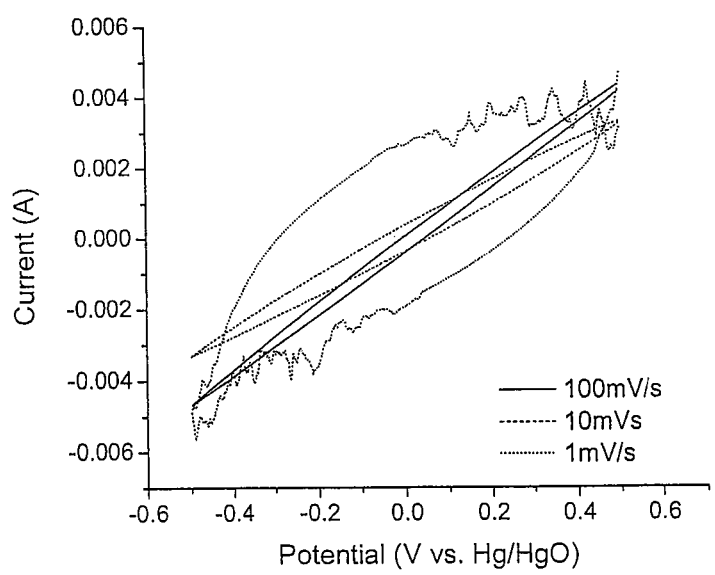
FIG. 10 shows plots of current delivered by an ultracapacitor as a function of potential voltage versus an Hg/HgO reference electrode at various scan rates, according to an embodiment of the present invention.

In addition to the chronoamperometry, another potentiostatic experiment that is useful for ultracapacitor performance is cyclic voltammetry. FIG. 10 shows plots of current delivered by an ultracapacitor as a function of potential voltage versus an Hg/HgO reference electrode at various scan rates, according to an embodiment of the present invention. The capacitance is directly proportional to half of the area within the hysteresis and inversely proportional to the scan rate. From these relationships, the cyclic voltammogram illustrates a higher capacitance with slower scan rates.

To evaluate the operational performance of a tri-continuous composite electrode, the measured capacitance is converted into a value for the stored energy. Equation (1) shows the relationships between the capacitance C and the energy E.

$$E = \frac{1}{2}CV^2 \quad (1)$$

According to Equation 1, the stored energy density is directly related to the capacitance and the square of the potential difference between the parallel composite electrodes.

The set-up for this experiment is a three-system with the parallel composite electrodes as the working and counter electrode, and an Hg/HgO electrode as the reference. An external high-impedance voltmeter is used to measure the potential across the parallel working and counter system.

Figure 11:
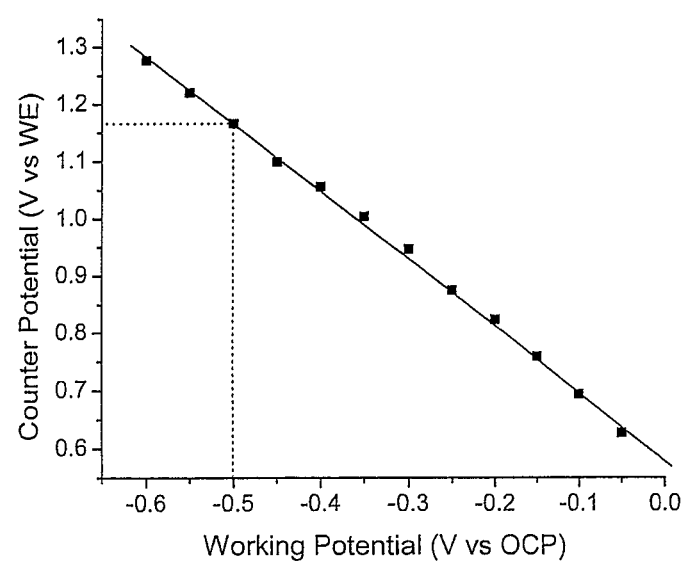
FIG. 11 is a plot of a counter potential voltage as a function of working potential voltage relative to OCP, according to an embodiment of the present invention.

FIG. 11 is a plot of a counter potential voltage relative to the working electrode (WE) as a function of working potential voltage relative to OCP, according to an embodiment of the present invention. FIG. 10 shows that the potential response as the applied potential is stepped negative potentials versus OCP.

Based on the bulk capacitance and the potential in FIG. 10 corresponding to the potential window when the voltage applied is −500 mV versus the OCP, the following calculation using equation (1) demonstrates the stored energy density of the parallel tri-continuous composite ultracapacitor.

$$E = \frac{1}{2} \cdot \frac{180F}{g} \cdot \frac{1000 \text{ g}}{\text{kg}} \cdot (1.15 \text{ V})^2 \frac{\text{hr}}{3600 \text{ s}} = 33.6 \text{ Wh/kg}$$

Conventional supercapacitors store between 2.5 and 4.3 Wh/kg. The above calculation shows that the present embodiment of the parallel tri-continuous composite ultracapacitor increases that value by an order of magnitude.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed:

1. A method for forming an electrode of a charge storage device, comprising:
    forming a mixture of particulates comprising an active material, an electroconductive material, and a void defining material into an electrode body comprising an essentially continuous phase of the active material, an essentially continuous phase of the electroconductive material, and an essentially continuous phase of the void defining material;
    removing the void defining material from the electrode body so as to leave behind an essentially continuous phase of voids;
    disposing the electrode body in an electrochemical cell; and
    initially oxidizing the active material by applying a potential to the electrode body in the cell so as to initially oxidize the active material, wherein the resulting initially oxided active material has a higher active surface area than the active material prior to said oxidizing, wherein thereafter during use the active material is oxidized and reduced only between the initially oxidized state and a further oxidized state.

2. The method according to claim 1, wherein said forming the mixture into the electrode body comprises compacting the mixture.

3. The method according to claim 2, wherein said forming the electrode body comprises heating the compacted electrode body to cause sintering of the electrode body.

4. The method according to claim 3, wherein said sintering of the electrode body comprises sintering the electroconductive material.

5. The method according to claim 3, wherein said heating the compacted electrode body also causes pyrolysis of the void defining material so as to perform said removing the void defining material.

6. The method according to claim 1, wherein said removing the void defining material comprises heating the electrode body to cause pyrolysis of the void defining material.

7. The method according to claim 1, further comprising adding a solvent to the mixture, and evaporating the solvent prior to said forming.

8. The method according to claim 1, further comprising grinding said mixture to form an essentially homogenous powder prior to said forming.

9. The method according to claim 8, further comprising adding a solvent to the mixture and evaporating the solvent prior to said grinding.

10. The method according to claim 7, further comprising subjecting said mixture to ultrasound energy after adding the solvent and prior to said forming.

11. The method according to claim 9, further comprising subjecting said mixture to ultrasound energy after adding the solvent and prior to said forming.

12. The method according to claim 3, wherein said heating comprises heating in a reducing atmosphere.

13. The method according to claim 4, wherein said heating comprises heating in a reducing atmosphere.

14. The method according to claim 5, wherein said heating comprises heating in a reducing atmosphere.

15. The method according to claim 2, further comprising adding a solvent to the mixture, and evaporating the solvent prior to said compacting.

16. The method according to claim 2, further comprising grinding said mixture to an essentially homogenous powder prior to said compacting.

17. The method according to claim 16, further comprising adding a solvent to the mixture, and evaporating the solvent prior to said grinding.

18. The method according to claim 15, further comprising subjecting said mixture to ultrasound energy after adding the solvent to the mixture and prior to the compacting.

19. The method according to claim 17, further comprising subjecting said mixture to ultrasound energy after adding the solvent to the mixture and prior to said grinding.

20. The method according to claim 2, wherein in the compacted mixture the particulates of the active material and the electroconductive material are on the nanometer scale and the particulates of the void defining material are on the micron scale.

21. The method according to claim 1, wherein in the formed electrode body the particulates of the active material and the electroconductive material are on the nanometer scale and the particulates of the void defining material are on the micron scale.

22. The method of claim 1, wherein oxidizing the active material comprises transforming the active material from a metal to an oxide species thereof to increase a volume occupied by the active material.

23. The method of claim 1, wherein the electroconductive material comprises a metal.

24. The method of claim 1, wherein the active material comprises a metal.

25. A method for forming an electrode of a charge storage device, comprising:
forming a mixture of particulates comprising a metallic active material, an electroconductive material, and a void defining material into an electrode body comprising an essentially continuous phase of the metallic active material, an essentially continuous phase of the electroconductive material, and an essentially continuous phase of the void defining material;
removing the void defining material from the electrode body so as to leave behind an essentially continuous phase of voids;
disposing the electrode body in an electrochemical cell; and
oxidizing the metallic active material by applying a potential to the electrode body in the cell so as to oxidize the metal thereof to an initial metal oxide, wherein during use the active material is oxidized and reduced only between the initial metal oxide and a further metal oxide.

26. The method according to claim 25, wherein said forming the mixture into the electrode body comprises compacting the mixture.

27. The method according to claim 26, wherein said forming the electrode body comprises heating the compacted electrode body to cause sintering of the electrode body.

28. The method according to claim 27, wherein said sintering of the electrode body comprises sintering the electroconductive material.

29. The method according to claim 27, wherein said heating the compacted electrode body also causes pyrolysis of the void defining material so as to perform said removing the void defining material.

30. The method according to claim 25, wherein said removing the void defining material comprises heating the electrode body to cause pyrolysis of the void defining material.

31. The method according to claim 25, further comprising adding a solvent to the mixture, and evaporating the solvent prior to said forming.

32. The method according to claim 25, further comprising grinding said mixture to form an essentially homogenous powder prior to said forming.

33. The method according to claim 32, further comprising adding a solvent to the mixture and evaporating the solvent prior to said grinding.

34. The method according to claim 32, further comprising subjecting said mixture to ultrasound energy after adding the solvent and prior to said forming.

35. The method according to claim 34, further comprising subjecting said mixture to ultrasound energy after adding the solvent and prior to said forming.

36. The method according to claim 27, wherein said heating comprises heating in a reducing atmosphere.

37. The method according to claim 28, wherein said heating comprises heating in a reducing atmosphere.

38. The method according to claim 29, wherein said heating comprises heating in a reducing atmosphere.

39. The method according to claim 26, further comprising adding a solvent to the mixture, and evaporating the solvent prior to said compacting.

40. The method according to claim 26, further comprising grinding said mixture to an essentially homogenous powder prior to said compacting.

41. The method according to claim 40, further comprising adding a solvent to the mixture, and evaporating the solvent prior to said grinding.

42. The method according to claim 39, further comprising subjecting said mixture to ultrasound energy after adding the solvent to the mixture and prior to the compacting.

43. The method according to claim 41, further comprising subjecting said mixture to ultrasound energy after adding the solvent to the mixture and prior to said grinding.

44. The method according to claim 26, wherein in the compacted mixture the particulates of the active material and the electroconductive material are on the nanometer scale and the particulates of the void defining material are on the micron scale.

45. The method according to claim 25, wherein in the formed electrode body the particulates of the active material and the electroconductive material are on the nanometer scale and the particulates of the void defining material are on the micron scale.

46. The method of claim 25, wherein oxidizing the active material comprises transforming the metallic active material to an oxide species thereof to increase a volume occupied by the active material.

47. A method for forming an electrode of a charge storage device, comprising:
forming a mixture of particulates comprising an active material, an electroconductive material, and a void defining material into an electrode body comprising an essentially continuous phase of the active material, an essentially continuous phase of the electroconductive material, and an essentially continuous phase of the void defining material;
removing the void defining material from the electrode body so as to leave behind an essentially continuous phase of voids;
disposing the electrode body in an electrochemical cell; and
oxidizing the active material by applying a potential to the electrode body in the cell so as to oxidize the active material, wherein the resulting oxided active material has a higher active surface area than the active material prior to said oxidizing,
the method further comprising adding a solvent to the mixture, and evaporating the solvent prior to said forming.

48. A method for forming an electrode of a charge storage device, comprising:
forming a mixture of particulates comprising an active material, an electroconductive material, and a void defining material into an electrode body comprising an essentially continuous phase of the active material, an essentially continuous phase of the electroconductive material, and an essentially continuous phase of the void defining material;
removing the void defining material from the electrode body so as to leave behind an essentially continuous phase of voids;
disposing the electrode body in an electrochemical cell; and
oxidizing the active material by applying a potential to the electrode body in the cell so as to oxidize the active material, wherein the resulting oxided active material has a higher active surface area than the active material prior to said oxidizing,
the method further comprising grinding said mixture to form an essentially homogenous powder prior to said forming.

49. A method for forming an electrode of a charge storage device, comprising:
forming a mixture of particulates comprising an active material, an electroconductive material, and a void defining material into an electrode body comprising an essentially continuous phase of the active material, an essentially continuous phase of the electroconductive material, and an essentially continuous phase of the void defining material;
removing the void defining material from the electrode body so as to leave behind an essentially continuous phase of voids;
disposing the electrode body in an electrochemical cell; and
oxidizing the active material by applying a potential to the electrode body in the cell so as to oxidize the active material, wherein the resulting oxided active material has a higher active surface area than the active material prior to said oxidizing,
wherein said forming the mixture into the electrode body comprises compacting the mixture,
the method further comprising adding a solvent to the mixture, and evaporating the solvent prior to said compacting.

50. A method for forming an electrode of a charge storage device, comprising:
forming a mixture of particulates comprising an active material, an electroconductive material, and a void defining material into an electrode body comprising an essentially continuous phase of the active material, an essentially continuous phase of the electroconductive material, and an essentially continuous phase of the void defining material;
removing the void defining material from the electrode body so as to leave behind an essentially continuous phase of voids;
disposing the electrode body in an electrochemical cell; and
oxidizing the active material by applying a potential to the electrode body in the cell so as to oxidize the active material, wherein the resulting oxided active material has a higher active surface area than the active material prior to said oxidizing,
wherein said forming the mixture into the electrode body comprises compacting the mixture,
the method further comprising grinding said mixture to an essentially homogenous powder prior to said compacting.

51. A method for forming an electrode of a charge storage device, comprising:
forming a mixture of particulates comprising an active material, an electroconductive material, and a void defining material into an electrode body comprising an essentially continuous phase of the active material, an essentially continuous phase of the electroconductive material, and an essentially continuous phase of the void defining material;
removing the void defining material from the electrode body so as to leave behind an essentially continuous phase of voids;
disposing the electrode body in an electrochemical cell; and
oxidizing the active material by applying a potential to the electrode body in the cell so as to oxidize the active material, wherein the resulting oxided active material has a higher active surface area than the active material prior to said oxidizing,
wherein said forming the mixture into the electrode body comprises compacting the mixture,
wherein in the compacted mixture the particulates of the active material and the electroconductive material are on the nanometer scale and the particulates of the void defining material are on the micron scale.

52. A method for forming an electrode of a charge storage device, comprising:

forming a mixture of particulates comprising an active material, an electroconductive material, and a void defining material into an electrode body comprising an essentially continuous phase of the active material, an essentially continuous phase of the electroconductive material, and an essentially continuous phase of the void defining material;

removing the void defining material from the electrode body so as to leave behind an essentially continuous phase of voids;

disposing the electrode body in an electrochemical cell; and oxidizing the active material by applying a potential to the electrode body in the cell so as to oxidize the active material, wherein the resulting oxided active material has a higher active surface area than the active material prior to said oxidizing, wherein in the formed electrode body the particulates of the active material and the electroconductive material are on the nanometer scale and the particulates of the void defining material are on the micron scale.

53. A method for forming an electrode of a charge storage device, comprising:

forming a mixture of particulates comprising a metallic active material, an electroconductive material, and a void defining material into an electrode body comprising an essentially continuous phase of the metallic active material, an essentially continuous phase of the electroconductive material, and an essentially continuous phase of the void defining material;

removing the void defining material from the electrode body so as to leave behind an essentially continuous phase of voids;

disposing the electrode body in an electrochemical cell; and oxidizing the metallic active material by applying a potential to the electrode body in the cell so as to oxidize the metal thereof to a metal oxide, the method further comprising adding a solvent to the mixture, and evaporating the solvent prior to said forming.

54. A method for forming an electrode of a charge storage device, comprising:

forming a mixture of particulates comprising a metallic active material, an electroconductive material, and a void defining material into an electrode body comprising an essentially continuous phase of the metallic active material, an essentially continuous phase of the electroconductive material, and an essentially continuous phase of the void defining material;

removing the void defining material from the electrode body so as to leave behind an essentially continuous phase of voids;

disposing the electrode body in an electrochemical cell; and oxidizing the metallic active material by applying a potential to the electrode body in the cell so as to oxidize the metal thereof to a metal oxide, the method further comprising grinding said mixture to form an essentially homogenous powder prior to said forming.

55. A method for forming an electrode of a charge storage device, comprising:

forming a mixture of particulates comprising a metallic active material, an electroconductive material, and a void defining material into an electrode body comprising an essentially continuous phase of the metallic active material, an essentially continuous phase of the electroconductive material, and an essentially continuous phase of the void defining material;

removing the void defining material from the electrode body so as to leave behind an essentially continuous phase of voids;

disposing the electrode body in an electrochemical cell; and oxidizing the metallic active material by applying a potential to the electrode body in the cell so as to oxidize the metal thereof to a metal oxide, wherein said forming the mixture into the electrode body comprises compacting the mixture, the method further comprising adding a solvent to the mixture, and evaporating the solvent prior to said compacting.

56. A method for forming an electrode of a charge storage device, comprising:

forming a mixture of particulates comprising a metallic active material, an electroconductive material, and a void defining material into an electrode body comprising an essentially continuous phase of the metallic active material, an essentially continuous phase of the electroconductive material, and an essentially continuous phase of the void defining material;

removing the void defining material from the electrode body so as to leave behind an essentially continuous phase of voids;

disposing the electrode body in an electrochemical cell; and oxidizing the metallic active material by applying a potential to the electrode body in the cell so as to oxidize the metal thereof to a metal oxide, wherein said forming the mixture into the electrode body comprises compacting the mixture, the method further comprising grinding said mixture to an essentially homogenous powder prior to said compacting.

57. A method for forming an electrode of a charge storage device, comprising:

forming a mixture of particulates comprising a metallic active material, an electroconductive material, and a void defining material into an electrode body comprising an essentially continuous phase of the metallic active material, an essentially continuous phase of the electroconductive material, and an essentially continuous phase of the void defining material;

removing the void defining material from the electrode body so as to leave behind an essentially continuous phase of voids;

disposing the electrode body in an electrochemical cell; and oxidizing the metallic active material by applying a potential to the electrode body in the cell so as to oxidize the metal thereof to a metal oxide, wherein said forming the mixture into the electrode body comprises compacting the mixture, wherein in the compacted mixture the particulates of the active material and the electroconductive material are on the nanometer scale and the particulates of the void defining material are on the micron scale.

58. A method for forming an electrode of a charge storage device, comprising:

forming a mixture of particulates comprising a metallic active material, an electroconductive material, and a void defining material into an electrode body comprising an essentially continuous phase of the metallic active material, an essentially continuous phase of the electroconductive material, and an essentially continuous phase of the void defining material;

removing the void defining material from the electrode body so as to leave behind an essentially continuous phase of voids;

disposing the electrode body in an electrochemical cell; and oxidizing the metallic active material by applying a potential to the electrode body in the cell so as to oxidize the metal thereof to a metal oxide, wherein in the formed electrode body the particulates of the active material and the electroconductive material are on the nanometer scale and the particulates of the void defining material are on the micron scale.

59. A method for forming an electrode of a charge storage device, comprising:

forming a mixture of particulates comprising an active material, an electroconductive material, and a void defining material into an electrode body comprising an essentially continuous phase of the active material, an essentially continuous phase of the electroconductive material, and an essentially continuous phase of the void defining material;

removing the void defining material from the electrode body so as to leave behind an essentially continuous phase of voids;

disposing the electrode body in an electrochemical cell; and irreversibly oxidizing the active material by applying a potential to the electrode body in the cell so as to oxidize the active material, wherein the resulting oxided active material has a higher active surface area than the active material prior to said irreversibly oxidizing.

60. A method for forming an electrode of a charge storage device, comprising:

forming a mixture of particulates comprising a metallic active material, an electroconductive material, and a void defining material into an electrode body comprising an essentially continuous phase of the metallic active material, an essentially continuous phase of the electroconductive material, and an essentially continuous phase of the void defining material;

removing the void defining material from the electrode body so as to leave behind an essentially continuous phase of voids;

disposing the electrode body in an electrochemical cell; and irreversibly oxidizing the metallic active material by applying a potential to the electrode body in the cell so as to oxidize the metal thereof to a metal oxide.

\* \* \* \* \*